US012637128B2

(12) United States Patent
Niwa et al.

(10) Patent No.: US 12,637,128 B2
(45) Date of Patent: May 26, 2026

(54) TRANSPORT ASSIST EQUIPMENT AND BED

(71) Applicant: KOYO MACHINE INDUSTRIES CO., LTD., Osaka (JP)

(72) Inventors: Hiroyuki Niwa, Yao (JP); Keisuke Nishino, Yao (JP)

(73) Assignee: KOYO MACHINE INDUSTRIES CO., LTD., Osaka (JP)

( * ) Notice: Subject to any disclaimer, the term of this patent is extended or adjusted under 35 U.S.C. 154(b) by 848 days.

(21) Appl. No.: 17/804,281

(22) Filed: May 26, 2022

(65) Prior Publication Data

US 2022/0388560 A1 Dec. 8, 2022

(30) Foreign Application Priority Data

Jun. 4, 2021 (JP) ................................. 2021-094626

(51) Int. Cl.
*B62B 5/00* (2006.01)
*A61G 7/08* (2006.01)

(52) U.S. Cl.
CPC .............. *B62B 5/0083* (2013.01); *A61G 7/08* (2013.01); *B62B 5/0033* (2013.01); *B62B 5/0073* (2013.01); *A61G 2203/32* (2013.01); *B62B 2301/254* (2013.01)

(58) Field of Classification Search
CPC ... B62B 5/0083; B62B 5/0033; B62B 5/0073; B62B 2301/254; A61G 7/08; A61G 2203/32
USPC ....................................................... 180/19.1
See application file for complete search history.

(56) References Cited

U.S. PATENT DOCUMENTS

| | | | |
|---|---|---|---|
| 3,876,255 A | 4/1975 | Ilon | |
| 9,937,943 B2 | 4/2018 | Nilsson et al. | |
| 10,555,849 B2 * | 2/2020 | Zhang | A61G 5/10 |
| 10,568,792 B2 * | 2/2020 | Derenne | A61G 7/08 |
| 2010/0300837 A1 | 12/2010 | Kosuge et al. | |
| 2016/0137216 A1 * | 5/2016 | Nilsson | B62B 3/001 |
| | | | 701/1 |
| 2016/0221595 A1 * | 8/2016 | Hane | B62B 5/04 |

(Continued)

FOREIGN PATENT DOCUMENTS

| | | | |
|---|---|---|---|
| JP | 2009-108542 A | | 5/2009 |
| JP | 2013-100076 A | | 5/2013 |
| JP | 2015112290 A | * | 6/2015 |

(Continued)

*Primary Examiner* — Valentin Neacsu
*Assistant Examiner* — Mohamed M Medani
(74) *Attorney, Agent, or Firm* — Studebaker Brackett PLLC

(57) ABSTRACT

A transport assist equipment assists transport of an object. The transport assist equipment includes a plurality of mecanum wheels, a plurality of motors, a first sensor, and a controller. The plurality of mecanum wheels are attached to the object. The plurality of motors are respectively attached to the plurality of mecanum wheels, and configured to respectively drive the plurality of mecanum wheels. The first sensor detects a force applied to the object. The controller is electrically connected to the first sensor and controls the plurality of motors. The controller drives the plurality of mecanum wheels via the motors so as to propel the object along a direction in which the object receives the force, based on a detection signal of the first sensor.

8 Claims, 12 Drawing Sheets

(56)     References Cited

U.S. PATENT DOCUMENTS

2017/0341465  A1     11/2017  Zdrahal et al.

FOREIGN PATENT DOCUMENTS

| | | | |
|---|---|---|---|
| JP | 2016-525977 | A | 9/2016 |
| JP | 2016-185722 | A | 10/2016 |
| JP | 2018-504305 | A | 2/2018 |
| JP | 2021071855 | A  * | 5/2021 |
| WO | 2014/187864 | A1 | 11/2014 |

* cited by examiner

FORWARD

LATERAL MOVEMENT

OBLIQUE MOVEMENT

RIGHT REAR WHEEL FULCRUM TURNING

TRANSPORT ASSIST EQUIPMENT AND BED

CROSS-REFERENCE TO RELATED APPLICATIONS

This application is based on and claims priority under 35 USC 119 from Japanese Patent Application No. 2021-094626 filed on Jun. 4, 2021, the contents of which are incorporated herein by reference.

TECHNICAL FIELD

The present disclosure relates to a transport assist equipment and a bed.

BACKGROUND

JP-A-2013-100076 discloses a bed transport assist equipment. The bed transport assist equipment includes an operation device attached to one end portion of a bed in a longitudinal direction (straight advancing direction), and a traveling carriage attached to the other end portion of the bed in the longitudinal direction.

The operation device of the equipment of JP-A-2013-100076 is operated by a nurse or the like to transmit an operation signal. The traveling carriage includes an axle and driving wheels attached to both end portions of the axle, and is configured to receive the operation signal transmitted from the operation device to turn the axle and operate the driving wheels in a state where the axle is turned to cause the traveling carriage to travel.

According to the equipment of JP-A-2013-100076, it is possible to assist the transport of the bed by causing the traveling carriage to travel in accordance with the operation of the operation device. By turning the axle at this time, it is possible to cause the traveling carriage to travel in any direction.

In the equipment of JP-A-2013-100076, since the traveling carriage is configured such that the driving wheels are turned by turning of the axle, it is necessary to secure a large space for turning the driving wheels so that the driving wheels and other members do not interfere with each other. Due to such a space, the equipment should become large sized.

SUMMARY

Embodiments of the present disclosure relates a compact sized transport assist equipment that assists transport of an object such as a bed.

In accordance with embodiments, a transport assist equipment assists transport of an object. The transport assist equipment includes a plurality of mecanum wheels, a plurality of motors, a first sensor, and a controller. The plurality of mecanum wheels are attached to the object. The plurality of motors are respectively attached to the plurality of mecanum wheels, and configured to respectively drive the plurality of mecanum wheels. The first sensor detects a force applied to the object. The controller is electrically connected to the first sensor and controls the plurality of motors. The controller drives the plurality of mecanum wheels via the motors so as to propel the object along a direction in which the object receives the force, based on a detection signal of the first sensor.

Moreover, in accordance with embodiments, a transport assist equipment is attached to a bed. The bed includes casters. The transport assist equipment includes a plurality of mecanum wheels attached to a lower surface of the bed, a plurality of motors respectively attached to the plurality of mecanum wheels and configured to respectively drive the plurality of mecanum wheels, a first sensor configured to detect a force applied to the bed, and a controller electrically connected to the first sensor and configured to control the plurality of motors. The controller is configured to drive the plurality of mecanum wheels via the motors so as to propel the bed along a direction in which the bed receives the force, based on a detection signal of the first sensor.

Furthermore, a transport assist equipment assists transport of an object. The transport assist equipment includes a plurality of mecanum wheels attached to the object, a plurality of motors respectively attached to the plurality of mecanum wheels and configured to respectively drive the plurality of mecanum wheels, a first sensor configured to detect a force applied to the object, a memory that stores instructions, and a processor configured to execute the instructions. The instructions cause the processor to perform driving the plurality of mecanum wheels via the motors so as to propel the object along a direction in which the object receives the force, based on a detection signal of the first sensor.

BRIEF DESCRIPTION OF DRAWINGS

FIG. 1 is a side view showing an overall configuration of a transport assist equipment and a medical bed.

FIG. 3 is a cross-sectional view showing a configuration of the transport assist equipment.

FIG. 6 is a block diagram showing a configuration of a control system of the transport assist equipment.

DESCRIPTION OF EMBODIMENTS

Embodiment will be described with reference to the drawings.

Figure 1:
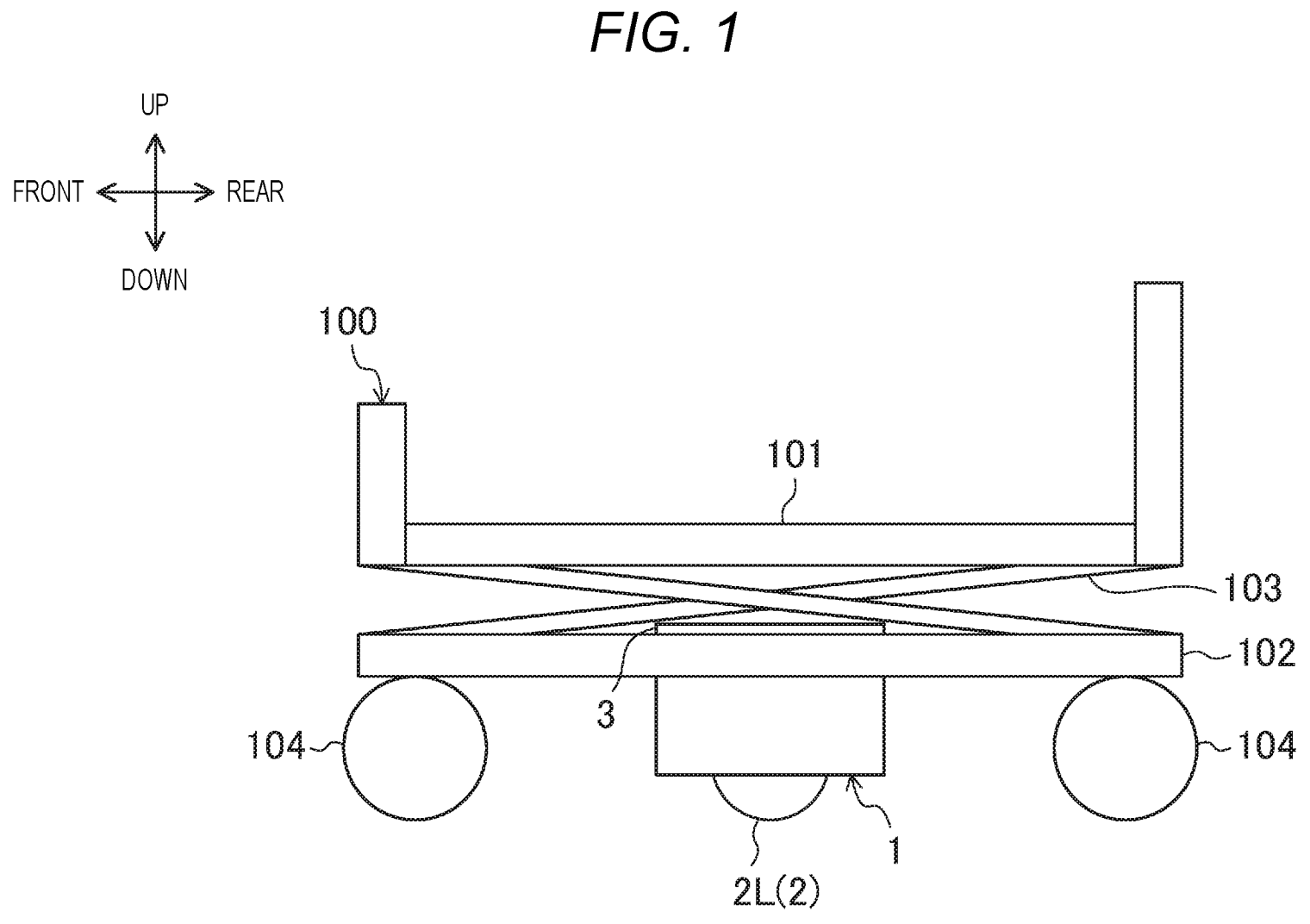
Figure 2:
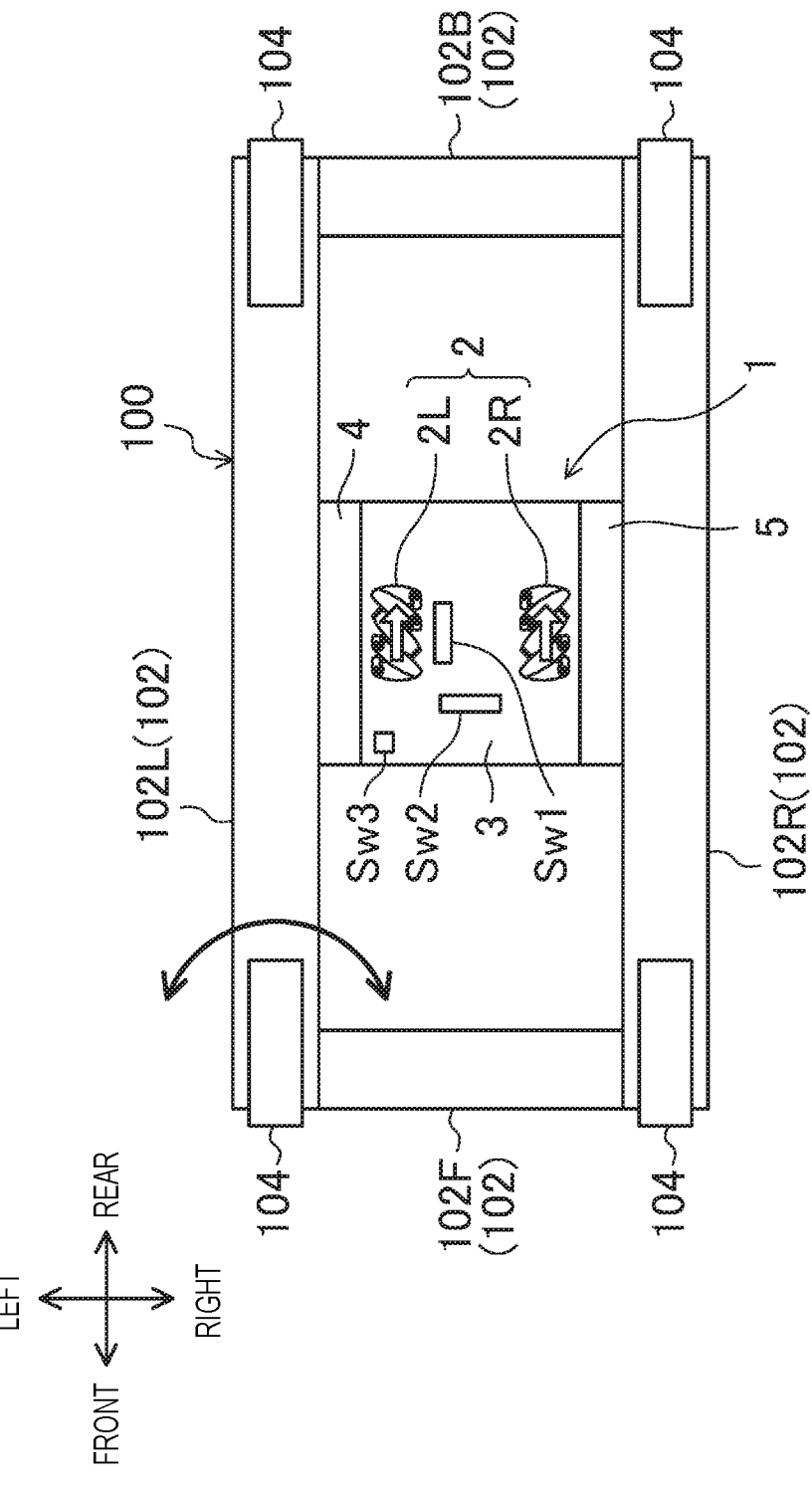
FIG. 2 is a bottom view showing the overall configuration of the transport assist equipment and the medical bed.

FIG. 1 is a side view showing an overall configuration of a transport assist equipment 1 and a medical bed 100. FIG. 2 is a bottom view showing the overall configuration of the transport assist equipment 1 and the medical bed 100.

Figure 3:
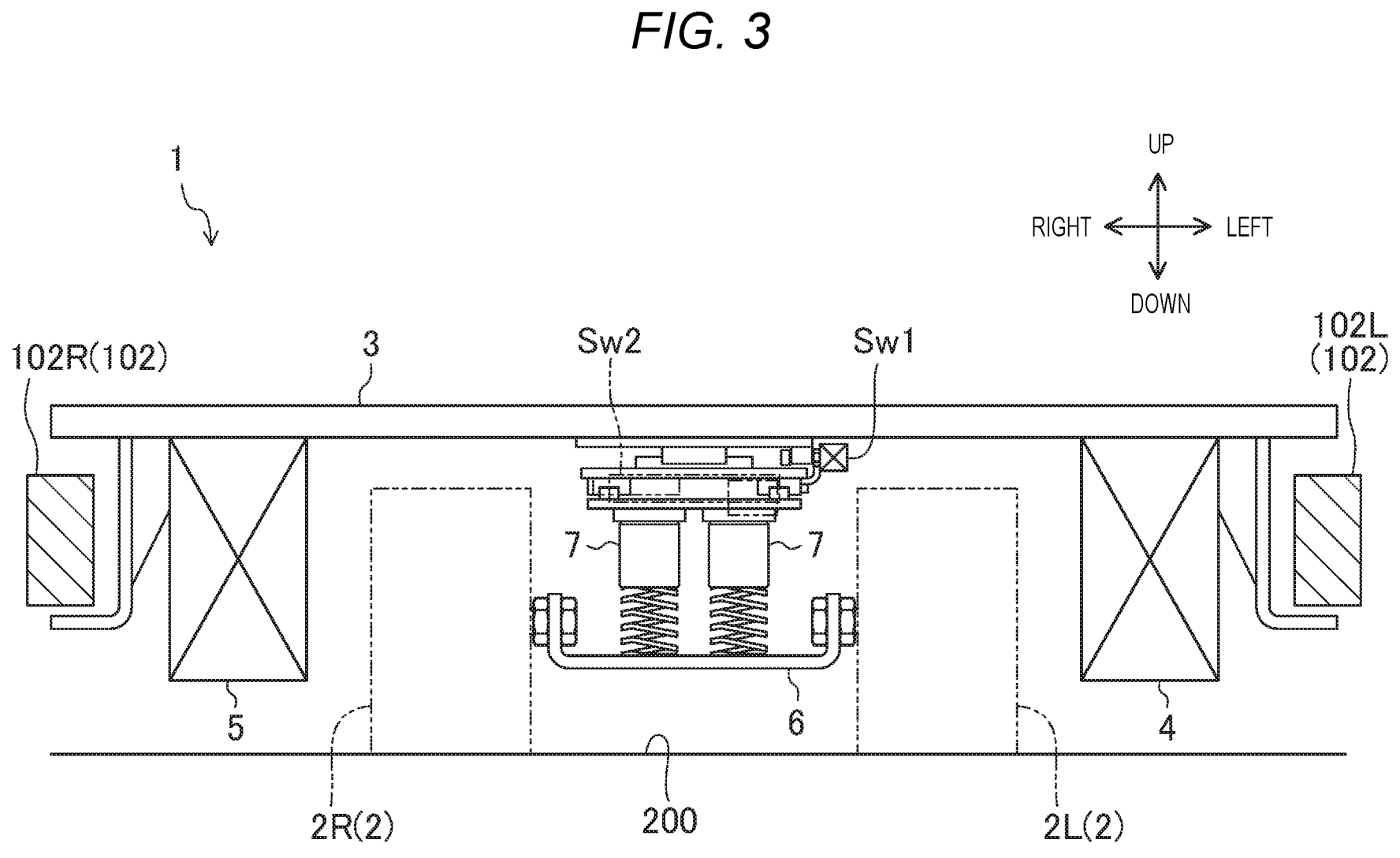
Figure 4:
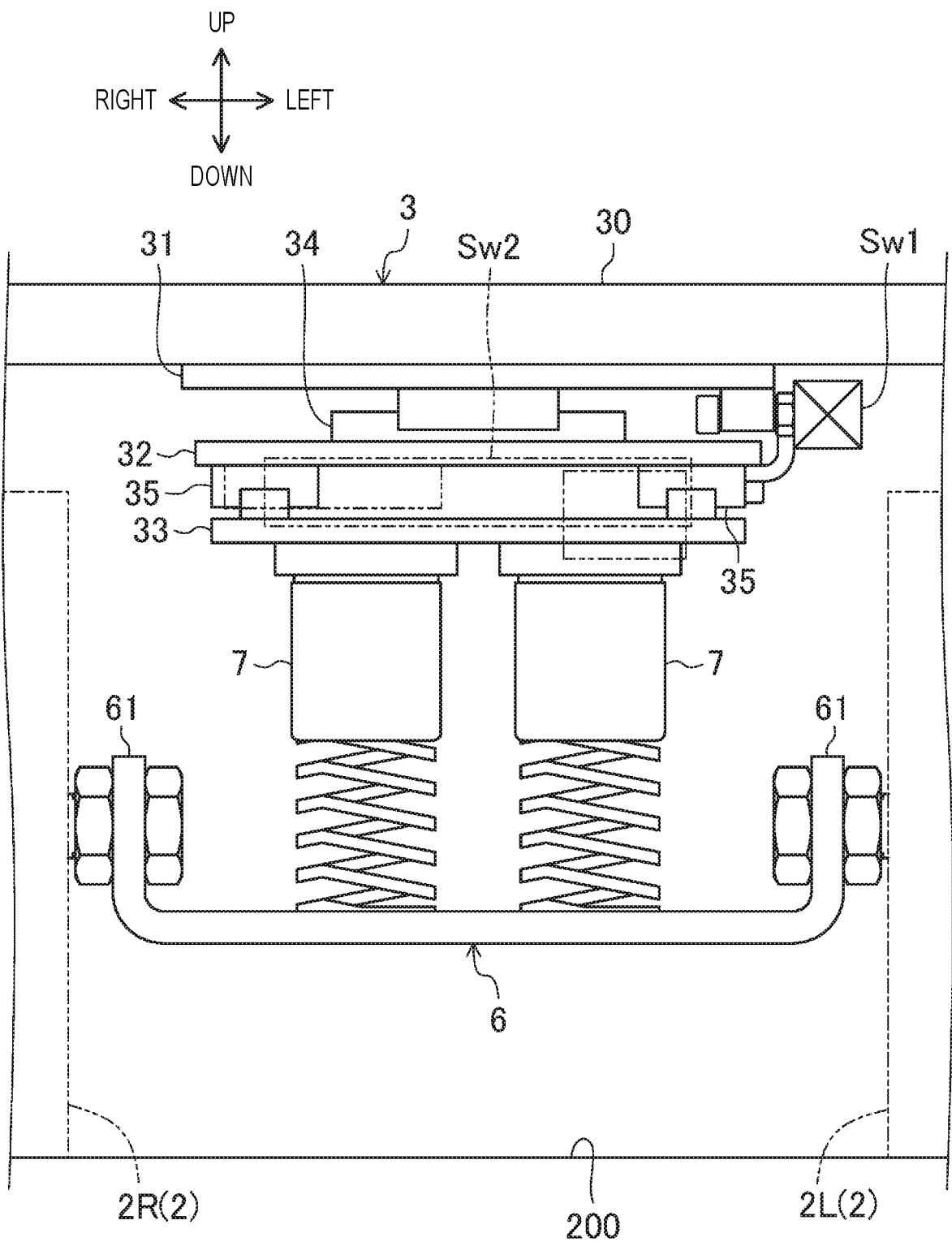
FIG. 4 is an enlarged view showing a main part of FIG. 3.
Figure 5:
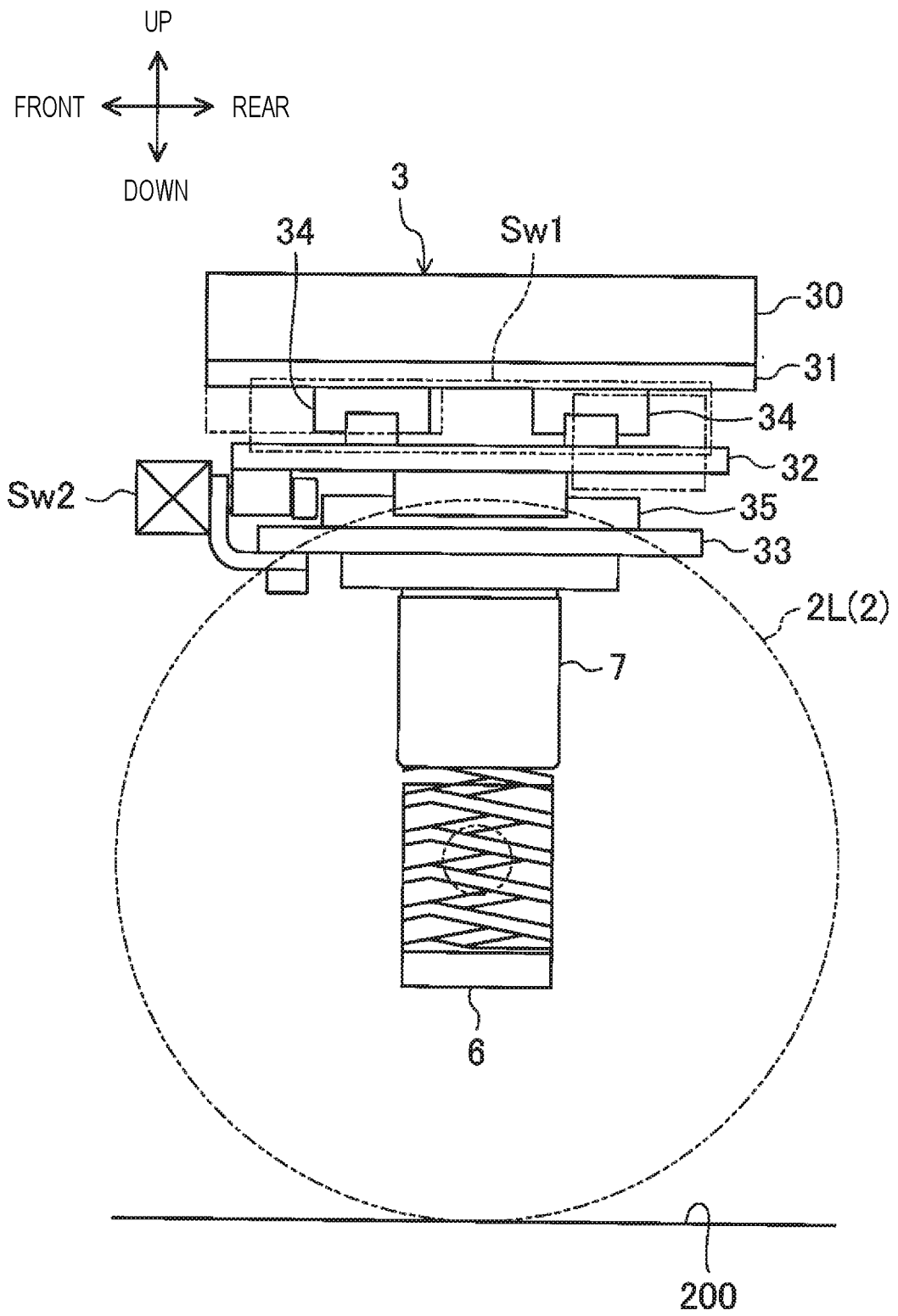
FIG. 5 is a side view showing the configuration of the transport assist equipment.

FIG. 3 is a cross-sectional view showing a configuration of the transport assist equipment 1. FIG. 4 is an enlarged view showing a main part of FIG. 3. FIG. 5 is a side view showing the configuration of the transport assist equipment 1.

As shown in FIGS. 1 and 2, the transport assist equipment 1 according to the embodiment is attached to a lower surface of a medical bed 100 with casters (hereinafter, simply referred to as a "bed") as an object, and is implemented to assist transport of the bed 100.

As shown in FIG. 1, the bed 100 includes a bed body 101 on which a mattress or the like is placed, a frame 102 that supports the bed body 101 from below, a lifting and lowering tool 103 that lifts and lowers the bed body 101 with respect to the frame 102, and four casters 104 provided at four corners of the frame 102.

The frame 102 has a rectangular frame shape, and includes a front frame 102F that extends along a left-right direction and is disposed on a front side of the bed 100, a right frame 102R that extends along a front-rear direction and is disposed on a right side of the bed 100, a left frame 102L that extends along the front-rear direction and is disposed on a left side of the bed 100, and a rear frame 102B that extends along the left-right direction and is disposed on a rear side of the bed 100.

In the frame 102, the transport assist equipment 1 is disposed so as to bridge a central portion in the front-rear direction of the right frame 102R and a central portion in the front-rear direction of the left frame 102L.

The transport assist equipment 1 according to the embodiment includes a plurality of motor-equipped mecanum wheels 2 attached to the lower surface of the bed 100 via an attachment plate 3, an X-axis force sensor Sw1 and a Y-axis force sensor Sw2 as first sensors for detecting a force applied to the bed 100, a gyro sensor Sw3 as a second sensor for detecting an angular velocity of the bed 100, a controller 4, and a battery 5. The "X-axis" refers to an axis that extends along the left-right direction and is orthogonal to an up-down direction. A direction along the X-axis is referred to as an "X direction" in the following description. Similarly, the "Y-axis" refers to an axis that extends along the front-rear direction and is orthogonal to the up-down direction. A direction along the Y-axis is referred to as a "Y direction" in the following description.

Here, the "mecanum wheel" relates to a wheel in which a surface of the wheel is covered with a plurality of barrel-shaped rollers (barrel-shaped rollers described later) inclined at 450 with respect to the axle. For example, the "mecanum wheel" are disclosed in JP-A-2009-108542, JP-A-2016-185722, and U.S. Pat. No. 3,876,255, the contents thereof are hereby incorporated by reference.

Each of the motor-equipped mecanum wheels 2, the controller 4, the battery 5, the X-axis force sensor Sw1, the Y-axis force sensor Sw2, and the gyro sensor Sw3 constituting the transport assist equipment 1 is assembled to the attachment plate 3, and can be attached to the lower surface of the bed 100 later via the attachment plate 3.

The attachment plate 3 includes an attachment plate body 30 that bridges the right frame 102R and the left frame 102L, a first plate portion 31 connected to a lower surface of the attachment plate body 30, a second plate portion 32 connected to a lower surface of the first plate portion 31, and a third plate portion 33 connected to a lower surface of the second plate portion 32.

The attachment plate body 30 has a rectangular plate shape extending along the left-right direction. The right frame 102R and the left frame 102L are fastened to both end portions of the attachment plate body 30. A right end portion of the attachment plate body 30 is formed in a concave shape in cross section opening rightward, and a central portion of the right frame 102R in the front-rear direction is fastened thereto. A left end portion of the attachment plate body 30 is formed in a concave shape in cross section opening leftward, and a central portion of the left frame 102L in the front-rear direction is fastened thereto.

The first plate portion 31 has a rectangular plate shape, and is attached to a central portion in the left-right direction of the lower surface of the attachment plate body 30. The second plate portion 32 has a plate shape having substantially the same dimensions as the first plate portion 31, and is disposed on the lower surface of the first plate portion 31. The third plate portion 33 has a plate shape having substantially the same dimensions as the first plate portion 31 and the second plate portion 32, and is disposed on the lower surface of the second plate portion 32. As shown in FIGS. 4 and 5, the X-axis force sensor Sw1 is attached to left side portions of the first plate portion 31 and the second plate portion 32, and the Y-axis force sensor Sw2 is attached to front portions of the second plate portion 32 and the third plate portion 33.

The first plate portion 31 and the second plate portion 32 are connected by two rows of first linear guides 34 and 34 slidable in the X direction. Relative positions of the first plate portion 31 and the second plate portion 32 are held by rigidity of the X-axis force sensor Sw1. Accordingly, only the force in the X direction acts on the X-axis force sensor Sw1.

Similarly, the second plate portion 32 and the third plate portion 33 are connected by two rows of second linear guides 35 and 35 slidable in the Y direction. Relative positions of the second plate portion 32 and the third plate portion 33 are held by the rigidity of the Y-axis force sensor Sw2. Accordingly, only the force in the Y direction acts on the Y-axis force sensor Sw2.

A pair of left and right suspensions 7 and 7 are attached to a lower surface of the third plate portion 33. Each of the suspensions 7 and 7 is structured to extend and contract in the up-down direction. Upper end portions of the suspensions 7 and 7 are attached to the third plate portion 33, and a bracket 6 is attached to lower end portions of the suspensions 7 and 7.

The bracket 6 is formed in the rectangular plate shape extending in the left-right direction, and a later-described first motor-equipped mecanum wheel 2R of the plurality of motor-equipped mecanum wheels 2 is attached to a flange portion 61 provided at a right end portion of the bracket 6, while a later-described second motor-equipped mecanum wheel 2L is attached to the flange portion 61 provided at a left end portion of the bracket 6.

When the suspensions 7 and 7 extend and contract in the up-down direction, the motor-equipped mecanum wheel 2 can be biased toward a floor surface 200. By the biasing, the motor-equipped mecanum wheel 2 can be constantly pushed against the floor surface 200.

Hereinafter, the configuration of the motor-equipped mecanum wheel 2 and the control using the motor-equipped mecanum wheel 2 by the transport assist equipment 1 will be described in detail.

Figure 6:
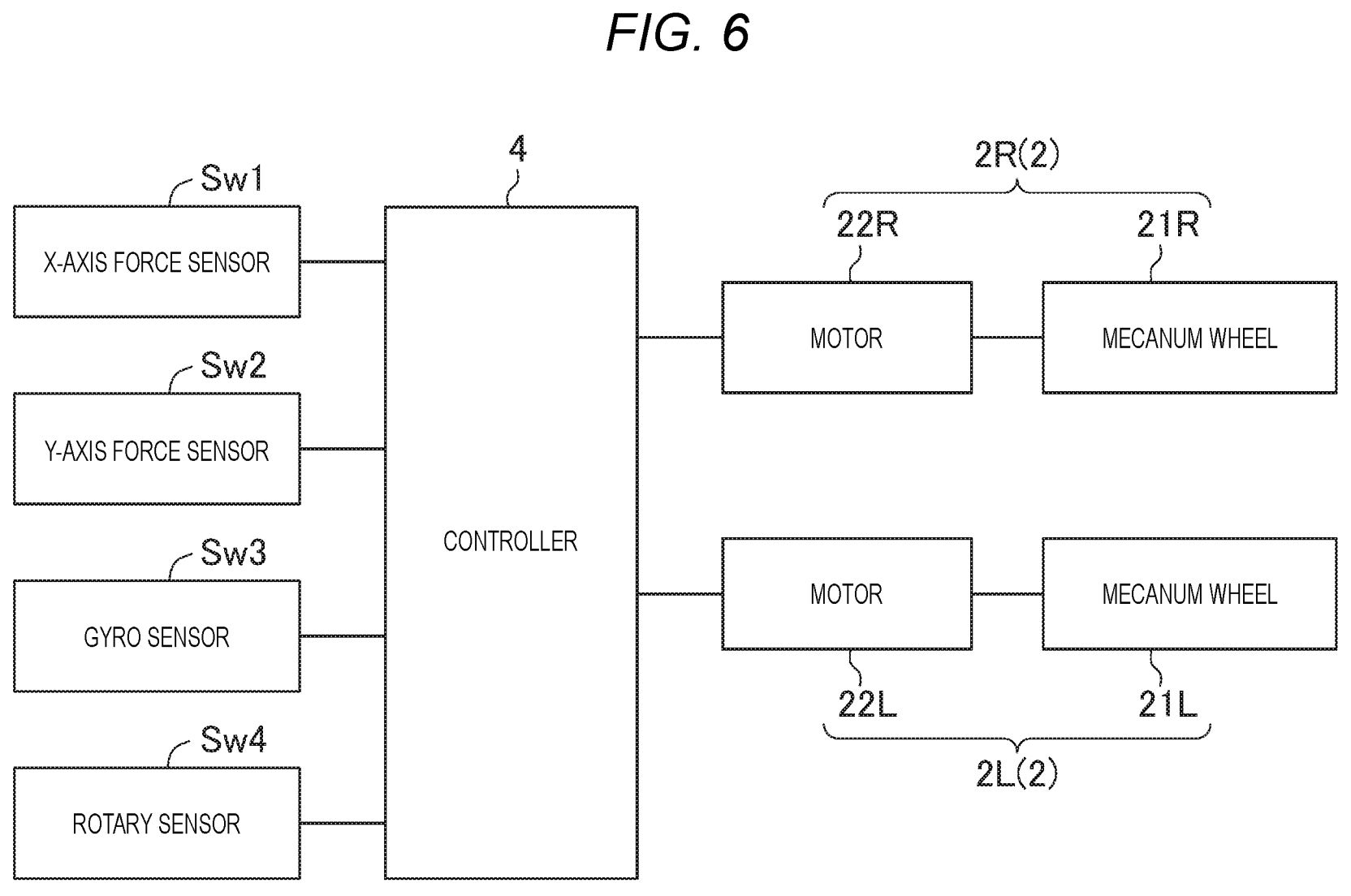
Figures 7A, 7B:
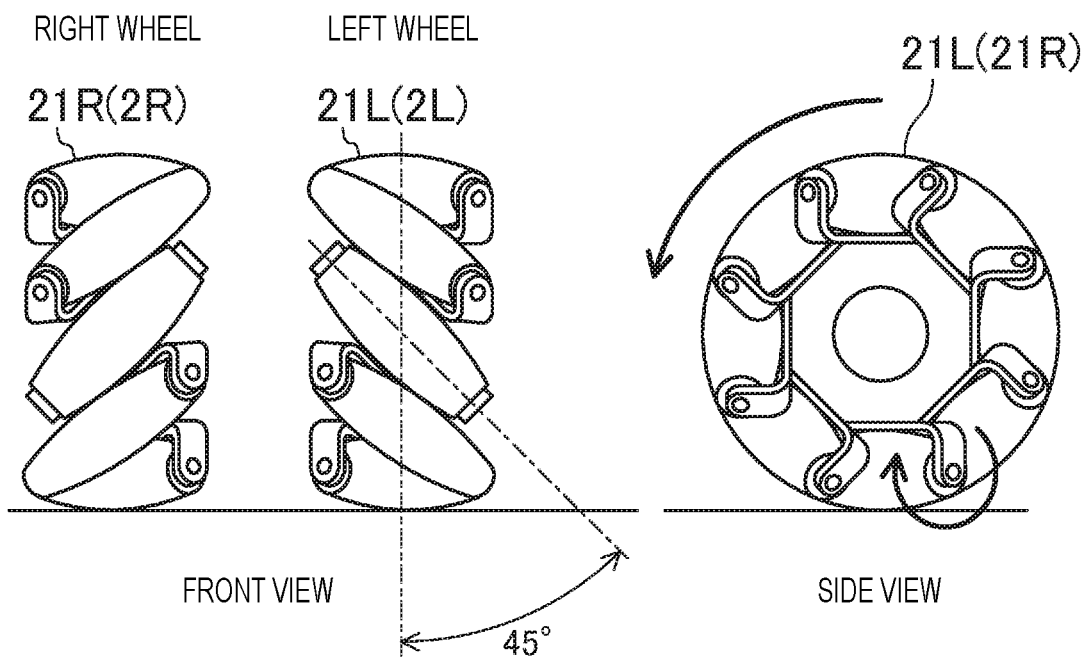
FIG. 7A is a diagram for illustrating a front view a mecanum wheel.
FIG. 7B is a diagram for illustrating a side view the mecanum wheel.
Figure 8A:
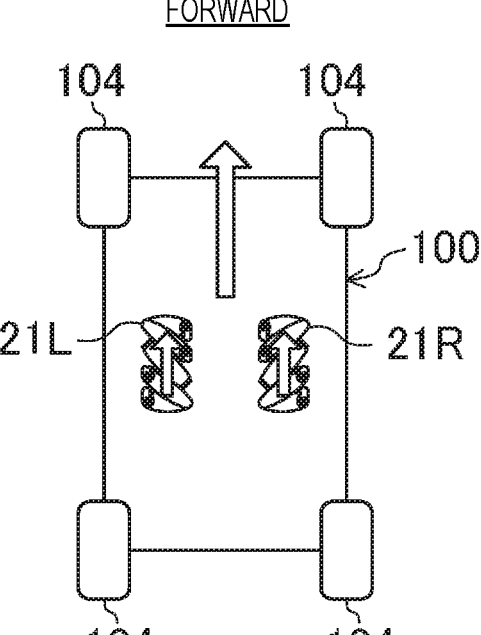
FIG. 8A is a diagram for illustrating a forward movement of the mecanum wheel.
Figure 8B:
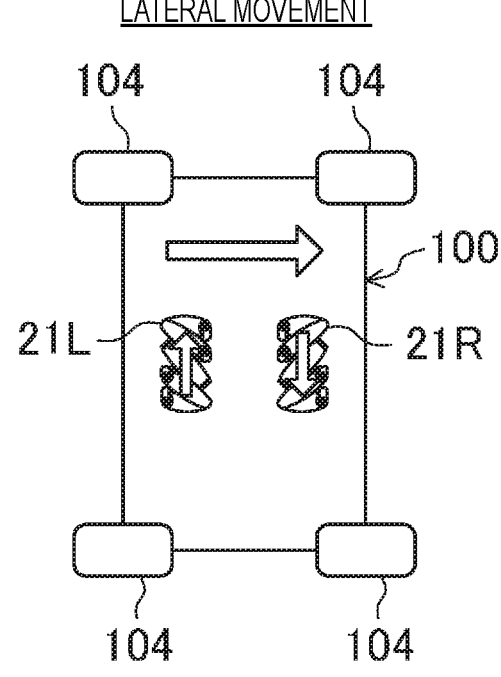
FIG. 8B is a diagram for illustrating a lateral movement of the mecanum wheel.
Figure 8C:
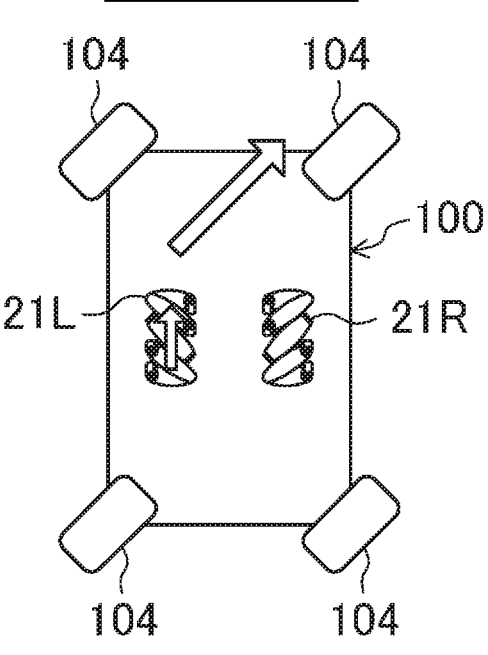
FIG. 8C is a diagram for illustrating an oblique movement of the mecanum wheel.
Figure 8D:
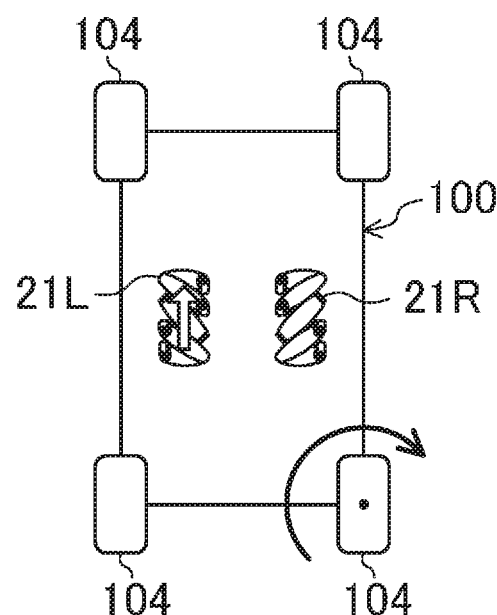
FIG. 8D is a diagram for illustrating a right rear wheel fulcrum turning of the mecanum wheel.
Figure 9:
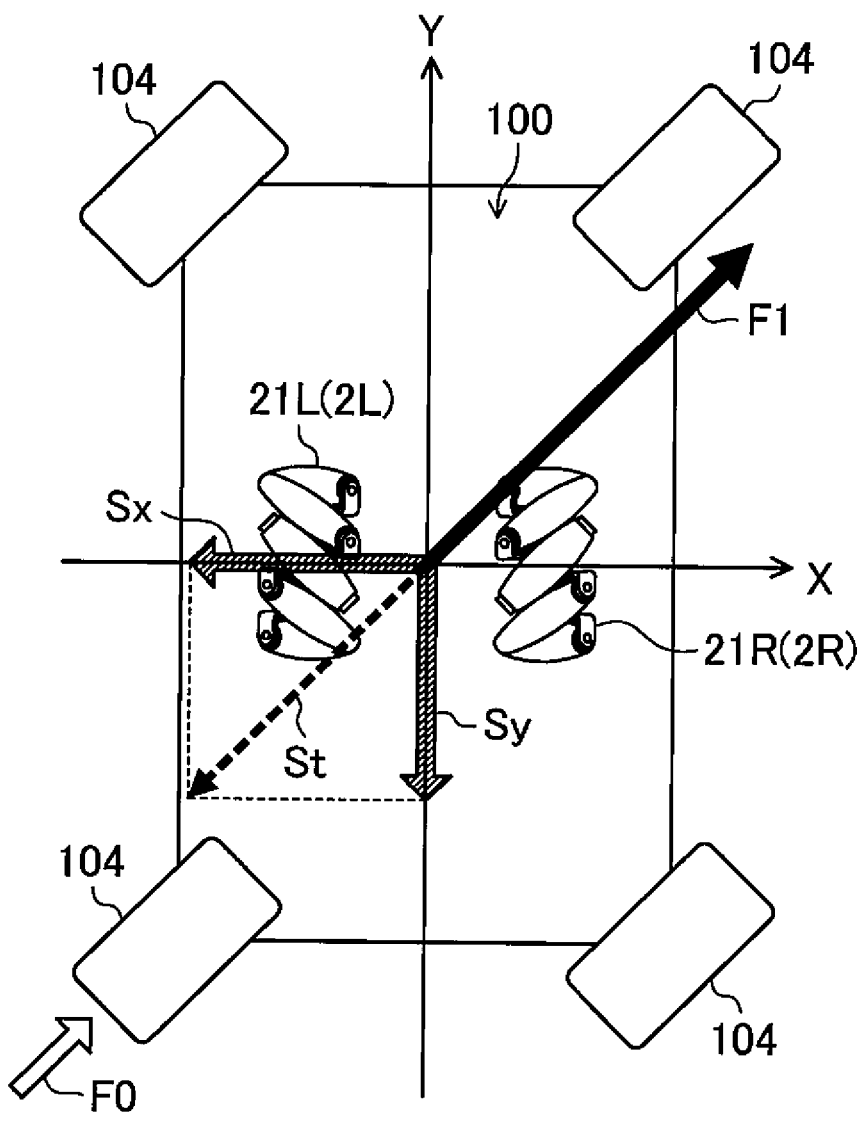
FIG. 9 is a diagram for illustrating assistance by the transport assist equipment.
Figure 10:
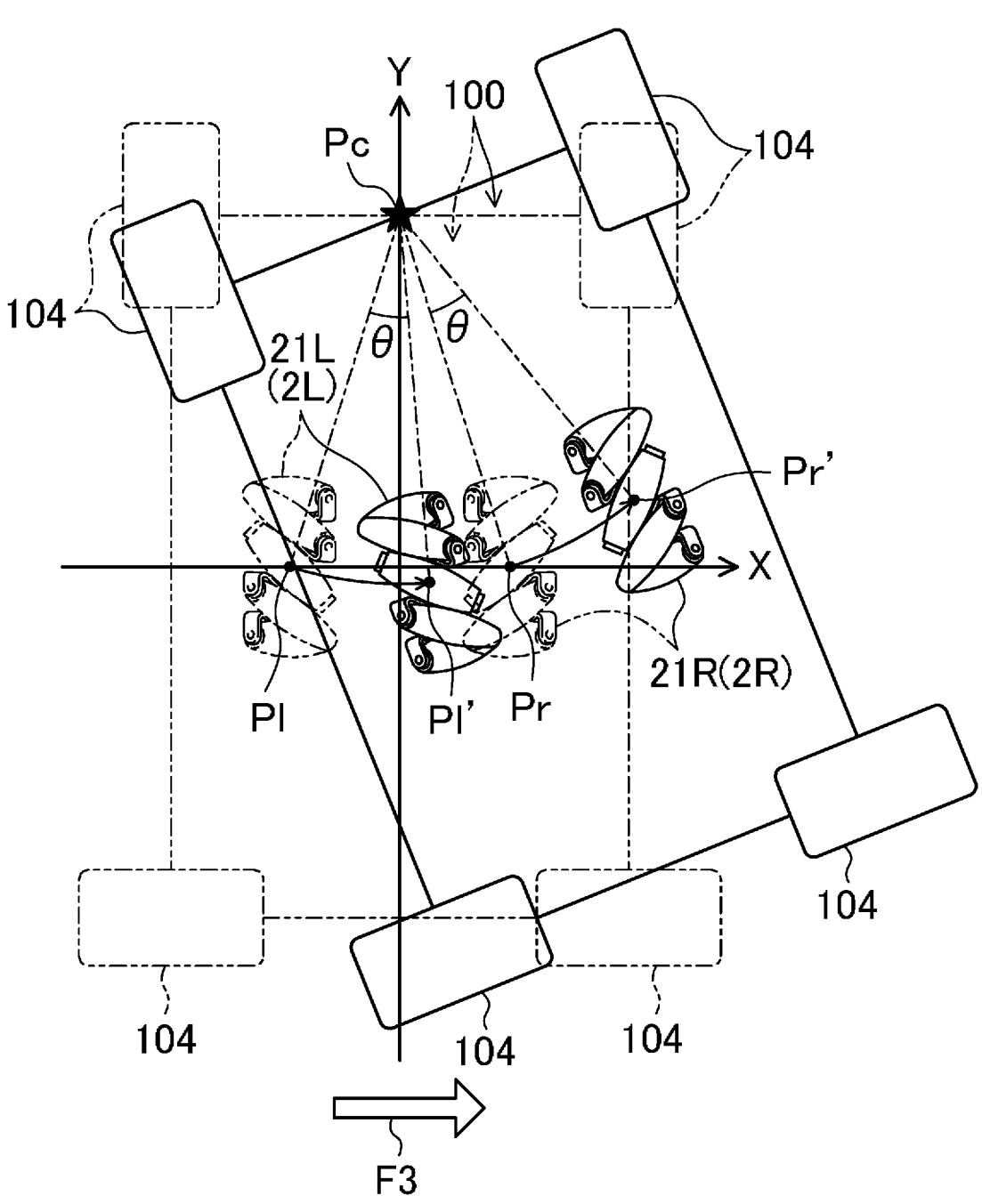
FIG. 10 is a diagram for illustrating the assistance by the transport assist equipment.

FIG. 6 is a block diagram showing a configuration of a control system of the transport assist equipment 1. FIG. 7A is a diagram for illustrating the configuration of the mecanum wheels 21R and 21L in front view. FIG. 7B is a diagram for illustrating the configuration of the mecanum wheels 21R and 21L in side view. FIG. 8A is a diagram for illustrating the operation of the mecanum wheels 21R and 21L in forward movement. FIG. 8B is a diagram for illustrating the operation of the mecanum wheels 21R and 21L in lateral movement. FIG. 8C is a diagram for illustrating the operation of the mecanum wheels 21R and 21L in oblique movement. FIG. 8D is a diagram for illustrating the operation of the mecanum wheels 21R and 21L in right rear wheel fulcrum turning. FIGS. 9 and 10 are diagrams for illustrating assistance by the transport assist equipment 1.

The plurality of motor-equipped mecanum wheels 2 include a plurality of mecanum wheels 21R and 21L, and motors 22R and 22L that are attached to the plurality of mecanum wheels 21R and 21L, respectively, and drive the mecanum wheels 21R and 21L, respectively.

Among these, the plurality of mecanum wheels 21R and 21L includes two mecanum wheels 21R and 21L arranged along a short side direction of the bed 100 (the left-right direction in the illustrated example). The two mecanum wheels 21R and 21L may be disposed side by side along the longitudinal direction of the bed 100 (the front-rear direction in the illustrated example), or may be disposed side by side along an oblique direction inclined to both the short side direction and the longitudinal direction.

Among the plurality of motor-equipped mecanum wheels 2, the first motor-equipped mecanum wheel 2R located on the right side has the mecanum wheel 21R and the motor 22R for driving the mecanum wheel 21R (the motor 22R is shown only in FIG. 6).

Among the plurality of motor-equipped mecanum wheels 2, the second motor-equipped mecanum wheel 2L located on the left side has the mecanum wheel 21L and the motor 22L for driving the mecanum wheel 21L (the motor 22L is shown only in FIG. 6).

As shown in FIGS. 7A and 7B, each of the mecanum wheels 21R and 21L is formed by attaching a plurality of barrel-shaped rollers, which are inclined at 45° with respect to a center of a wheel body, on a circumference of the wheel body.

As shown in FIGS. 8A to 8D, the two mecanum wheels 21R and 21L are disposed so that the barrel-shaped rollers are reflection-symmetrical to each other with respect to a mirror plane extending along the front-rear direction (the barrel-shaped rollers are disposed so that inclination directions thereof are opposite to each other). As shown in FIGS. 8A to 8D, when viewed from above, the inclination direction of each barrel-shaped roller extends from an inner side to an outer side in the left-right direction (from the central portion in the left-right direction to the right side or the left side) from the rear side to the front side along the front-rear direction. The inclination direction of each barrel-shaped roller is not limited to the example shown in FIGS. 8A to 8D and the like.

When both of the two mecanum wheels 21R and 21L are driven so as to rotate forward, it is possible to assist a forward movement of the bed 100. When both of the two mecanum wheels 21R and 21L are driven to rotate backward, it is possible to assist a backward movement of the bed 100 (not shown).

Further, when one of the two mecanum wheels 21R and 21L is driven to rotate forward and the other is driven to rotate backward, it is possible to assist a lateral movement (movement along the left-right direction) of the bed 100.

Further, when only one of the two mecanum wheels 21R and 21L is driven to rotate forward or backward, the oblique movement of the bed 100 can be assisted. The oblique movement can also assist tuning with any one of the four casters 104 provided on the bed 100 as a fulcrum (turning with the caster 104 of the right rear wheel as a fulcrum in the illustrated example). At this time, by setting the inclination direction of each barrel-shaped roller as described above, the left mecanum wheel 21L is driven when assisting the turning with the caster 104 of the right rear wheel as the fulcrum, and the right mecanum wheel 21R is driven when assisting the tuning with the caster 104 of the left rear wheel as the fulcrum. In this way, by implementing to drive the mecanum wheels 21R and 21L outside the fulcrum at the time of assisting the turning, it is possible to implement an assist close to an actual work feeling.

The two mecanum wheels 21R and 21L are allowed to rotate forward and backward even when the corresponding motors 22R and 22L are not driven. Accordingly, it is possible to prevent staggering of the bed 100 when the bed 100 is pushed and conveyed, and to stabilize the transport of the bed 100.

Driving of the mecanum wheels 21R and 21L by the motors 22R and 22L can be controlled through a detection signal of the first sensor. The transport assist equipment 1 according to the embodiment includes the X-axis force sensor Sw1 and the Y-axis force sensor Sw2 including strain gauge sensors as the first sensors.

The X-axis force sensor Sw1 detects strain in the X direction (left-right direction) generated between the first plate portion 31 and the second plate portion 32. The first plate portion 31 is connected to the frame 102 via the attachment plate body 30. The second plate portion 32 is connected to each of the mecanum wheels 21R and 21L via the third plate portion 33, the suspension 7, and the bracket 6. Therefore, the X-axis force sensor Sw1 can detect the strain in the X direction generated between the frame 102 and the two mecanum wheels 21R and 21L via the attachment plate body 30, the third plate portion 33, the suspension 7, and the bracket 6. The detection signal of the X-axis force sensor Sw1 is input to the controller 4.

The Y-axis force sensor Sw2 detects a strain in the Y direction (front-rear direction) generated between the second plate portion 32 and the third plate portion 33. The second plate portion 32 is connected to the frame 102 via the first plate portion 31 and the attachment plate body 30. The third plate portion 33 is connected to each of the mecanum wheels 21R and 21L via the suspension 7 and the bracket 6. Therefore, the Y-axis force sensor Sw2 can detect the strain in the Y direction generated between the frame 102 and the two mecanum wheels 21R and 21L. The detection signal of the Y-axis force sensor Sw2 is input to the controller 4.

Driving of the mecanum wheels 21R and 21L by the motors 22R and 22L can also be controlled through a detection signal of the second sensor. The transport assist equipment 1 according to the embodiment further includes the gyro sensor Sw3 as the second sensor. The gyro sensor Sw3 detects an angular velocity at any position (for example, in the case of the bed 100, tip end portion on the front side), and inputs the detection signal to the controller 4.

The transport assist equipment 1 also includes a rotation sensor Sw4 (shown only in FIG. 6) that detects the rotation of each of the mecanum wheels 21R and 21L. The rotation sensor Sw4 may be, for example, a Hall element sensor provided in each of the motors 22R and 22L. A detection signal of the rotation sensor Sw4 is input to the controller 4.

The controller 4 is attached to the lower surface of the attachment plate 3. As shown in FIGS. 2 and 3, the controller 4 is disposed between the second motor-equipped mecanum wheel 2L and the left frame 102L in the left-right direction.

The controller 4 includes a CPU (processor), a memory, and an input and output bus. The controller 4 is electrically connected to the X-axis force sensor Sw1, the Y-axis force sensor Sw2, the gyro sensor Sw3, and the rotation sensor Sw4. Each motor 22R, 22L can be individually controlled based on the detection signals of the sensors.

Specifically, the controller 4 according to the embodiment drives the two mecanum wheels 21R and 21L via the motors 22R and 22L so as to propel the bed 100 along the direction in which the bed 100 receives the force (a traveling direction of the bed 100) based on the detection signals of the X-axis force sensor Sw1 and the Y-axis force sensor Sw2.

When a strain gauge type sensor is used as described above, the controller 4 can drive the two mecanum wheels 21R and 21L in the following manner. For example, as shown in FIG. 9, when a force F0 is applied to the left rear wheel of the four casters 104 in an obliquely forward direction F1, the force F0 is transmitted from the casters 104 to the mecanum wheels 21R and 21L via the frame 102, the attachment plate 3, the suspension 7, and the bracket 6. Therefore, when the bed 100 starts to move by applying the force F0 to the bed 100, the mecanum wheels 21R and 21L start to rotate by the movement of the bed 100. When the force F0 is applied to the bed 100, a strain St occurs between the frame 102 and the mecanum wheels 21R and 21L.

A direction of the strain St generated in this way corresponds to a direction obtained by inverting the direction F1 in which the bed 100 receives the force. Therefore, by calculating the direction of the strain St, the direction F1 in which the bed 100 receives the force can be acquired. It is considered that as the force F0 applied to the bed 100 increases, a speed of pushing the bed 100 increases, and the strain St caused thereby also increases. Therefore, by acquiring a magnitude of the strain St, it is possible to estimate the speed of pushing the bed 100.

Specifically, the controller 4 acquires a strain Sx generated in the X direction based on the detection signal of the X-axis force sensor Sw1, and acquires a strain Sy generated in the Y direction based on the detection signal of the Y-axis force sensor Sw2. The controller 4 calculates a combined vector of the two strains Sx and Sy to calculate the direction and the magnitude of the strain St as viewed in an entire XY direction.

Then, the controller 4 individually drives the two mecanum wheels 21R and 21L so as to offset the calculated strain St. As described above, since the direction of the strain St is equal to the direction obtained by reversing the direction F1 in which the bed 100 receives the force (the traveling direction of the bed 100), driving the two mecanum wheels 21R and 21L so as to offset the strain St is equal to propelling the bed 100 along the direction F1 in which the bed 100 receives the force.

Further, the controller 4 can determine rotation speeds of the two mecanum wheels 21R and 21L (rotation speeds of the motors 22R and 22L) based on the magnitude of the strain St. When the speed of pushing the bed 100 is large, that is, when the strain St is large, the controller 4 sets the rotation speeds of the motors 22R and 22L to be higher than when the speed of pushing the bed 100 is small. The controller 4 determines the rotation speed of each of the motors 22R and 22L according to the magnitude of the strain St, and drives each of the motors 22R and 22L so as to implement the determined rotation speed.

After detecting the rotation of at least one of the two mecanum wheels 21R and 21L, the controller 4 drives the two mecanum wheels 21R and 21L via the motors 22R and 22L so as to propel the bed 100 along the direction F1 in which the bed 100 receives the force. Determination of whether the two mecanum wheels 21R and 21L are rotating is executed by the controller 4 based on the detection signal of the rotation sensor Sw4. In response to the detection of the rotation of at least one of the two mecanum wheels 21R and 21L based on the detection signals of the X-axis force sensor Sw1 and the Y-axis force sensor Sw2, the controller 4 starts driving the motors 22R and 22L.

Further, the controller 4 drives the two mecanum wheels 21R and 21L via the motors 22R and 22L so as to assist the turning of the bed 100 based on the detection signal of the gyro sensor Sw3.

For example, as shown in FIG. 10, a case is considered in which a force F3 is applied to a rear side portion of the bed 100 to turn the bed 100 about a front end portion Pc as the fulcrum. In this case, the gyro sensor Sw3 is attached to any place, and a turning radius between a preset fulcrum (front end portion Pc in the illustrated example) of the bed and each of central portions Pr and P1 of the two mecanum wheels 21R and 21L is stored in advance in the controller 4. When the bed 100 is turned, the central portions Pr and P1 move to coordinates Pr' and Pl', respectively.

The controller 4 calculates a rotation angle θ and a turning speed in the middle of turning at each of the central portions Pr and P1 based on the detection signal of the gyro sensor Sw3 and the turning radius stored in advance. Positive and negative of the rotation angle θ correspond to a turning direction. Therefore, calculating the rotation angle θ is equivalent to acquiring the turning direction of the bed 100. The controller 4 drives the motors 22R and 22L such that the bed 100 rotates along the acquired turning direction.

In general, the rotation angle θ is common between the front end portion Pc of the bed 100 and each of the central portions Pr and P1 of the two mecanum wheels 21R and 21L, whereas the turning speed may be different. The controller 4 determines the rotation speeds of the motors 22R and 22L according to the turning speeds at the central portions Pr and Pl, and drives the motors 22R and 22L so as to implement the determined rotation speed.

The battery 5 is attached to the lower surface of the attachment plate 3. As shown in FIGS. 2 and 3, the battery 5 is disposed between the first motor-equipped mecanum wheel 2R and the right frame 102R in the left-right direction. The two motor-equipped mecanum wheels 2 are disposed between the controller 4 and the battery 5 in the left-right direction. The battery 5 supplies electric power to each unit of the transport assist equipment 1, such as the controller 4 and the motors 22R and 22L.

Figure 11:
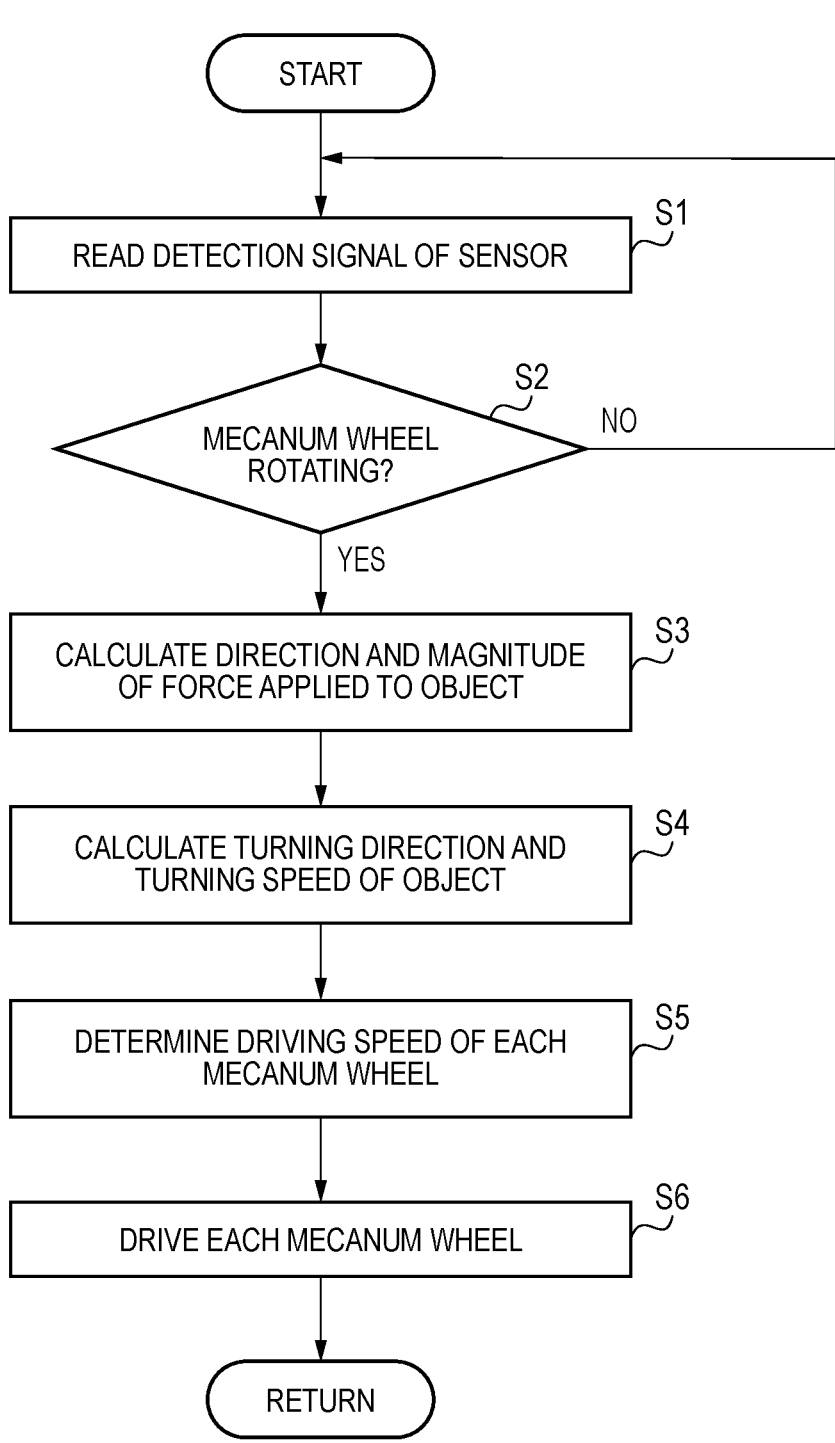
FIG. 11 is a flowchart showing a specific example of operation by a controller.
Figure 12:
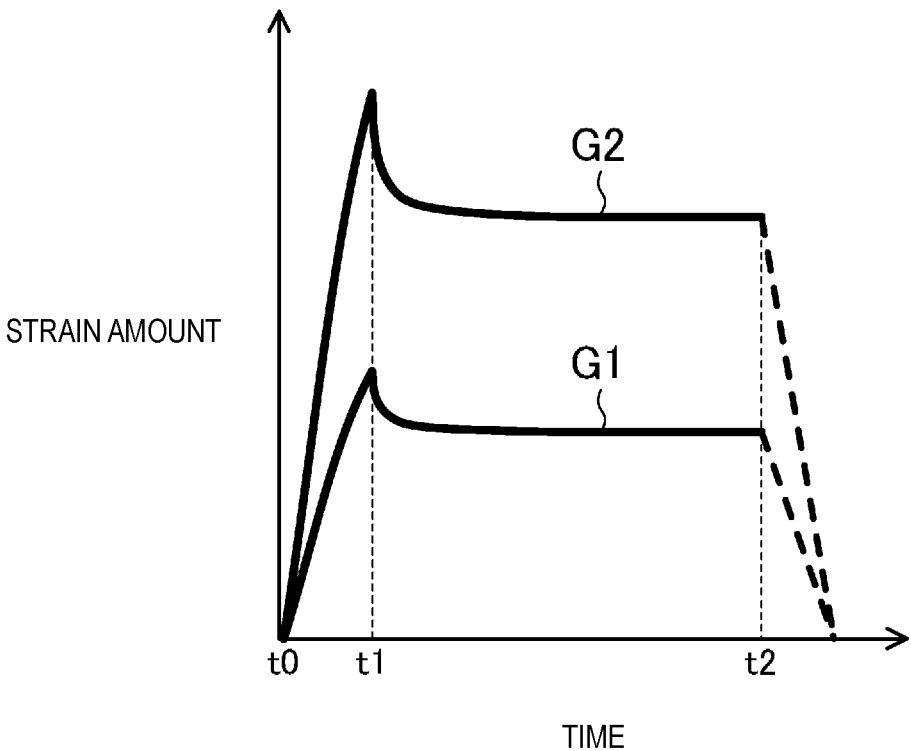
FIG. 12 is a graph showing a relationship between a strain amount and a timing at which the assistance is performed.

Hereinafter, a specific example of operation performed by the controller 4 will be described with reference to FIGS. 11 and 12. FIG. 11 is a flowchart showing a specific example of the operation by the controller 4. FIG. 12 is a graph showing a relationship between a strain amount and a timing at which the assistance is performed.

It is assumed that a force is applied to the bed 100 at a time t0 in FIG. 12, and the bed 100 starts to move due to the force. In this case, although a force is applied to the transport assist equipment 1 almost at the same time as the bed 100 starts moving, the mecanum wheels 21R and 21L do not immediately rotate due to a static frictional force generated in mechanical elements such as rotary shafts of the mecanum wheels 21R and 21L. In this case, since the mecanum wheels 21R and 21L are about to stay on the spot, the strain St generated between the frame 102 and attachment portions (third plate portions 33) of the mecanum wheels 21R and 21L linearly increases with time (see a period from the time t0 to a time t1). The magnitude of the strain St is reflected in the detection signals of the X-axis force sensor Sw1 and the Y-axis force sensor Sw2.

Then, at a timing when the force applied to the mecanum wheels 21R and 21L exceeds the above described static frictional force (see the time t1 in FIG. 12), the mecanum wheels 21R and 21L start to rotate. When the mecanum wheels 21R and 21L start to rotate, the frictional force acting on the mecanum wheels 21R and 21L changes from the static frictional force to a dynamic frictional force. In general, since the dynamic friction force is smaller than the static friction force, the strain St decreases (see a period from the time t1 to a time t2). The period from the time t1 to the time t2 indicates a momentary time lag from the start of the rotation of the mecanum wheels 21R and 21L to the driving of the motors 22R and 22L.

In this case, first, in step S1 of FIG. 11, the controller 4 reads the detection signals of the X-axis force sensor Sw1, the Y-axis force sensor Sw2, and the gyro sensor Sw3.

In subsequent step S2, the controller 4 determines whether at least one of the two mecanum wheels 21R and 21L is rotating based on the detection signal of the rotation sensor Sw4. When the determination is NO, the controller 4 returns the control process to step S1. When the determination is YES, the control process proceeds to step S3.

In subsequent step S3, the controller 4 calculates the direction and magnitude of the strain generated between the frame 102 and each of the mecanum wheels 21R and 21L based on the detection signals of the X-axis force sensor Sw1 and the Y-axis force sensor Sw2. Instead of performing the calculation, the direction and the magnitude of the force applied to the bed 100 may be directly calculated.

In subsequent step S4, the controller 4 calculates the turning direction and the turning speed of the bed 100 as the object based on the detection signal of the gyro sensor Sw3. The calculation is performed with reference to the turning radius stored in advance as described above.

In subsequent step S5, the controller 4 determines driving speeds of the mecanum wheels 21R and 21L (rotation speeds of the corresponding motors 22R and 22L). The determination can be performed based on the magnitude of the strain calculated in step S3, the turning speed of the bed 100 calculated in step S4, and the like. For example, when the speed at which the bed 100 is pushed is low and the strain amount caused by the pushing is small (see graph G1 in FIG. 12), the driving speed of each of the mecanum wheels 21R and 21L is set to be relatively low, while when the speed of the bed 100 is high and the strain amount caused by the pushing is large (see graph G2 in FIG. 12), the driving speed of each of the mecanum wheels 21R and 21L is set to be relatively high.

In the example of FIG. 12, the static friction is changed to the dynamic friction at time t1, the rotation of the mecanum wheels 21R and 21L is detected, and in step S6 subsequent to step S5, the controller 4 inputs the control signal to the motors 22R and 22L at any timing within the period from time t1 to time t2 to drive the mecanum wheels 21R and 21L. Thereafter, when the assistance is started at the time t2 in FIG. 12, the strain generated between the frame 102 and each of the mecanum wheels 21R and 21L is offset. Accordingly, as shown after the time t2 in FIG. 12, the magnitude of the strain amount decreases toward zero. When the driving speed of each of the mecanum wheels 21R and 21L is set to be relatively high as in the graph G2 of FIG. 12, the strain amount rapidly decreases as compared with the case where the driving speed of each of the mecanum wheels 21R and 21L is set to be relatively low as in the graph G1 of FIG.

12. As shown in FIG. 12, regardless of the force applied to the bed 100 and the driving speed of the mecanum wheels 21R and 21L, the time lag from when the force is applied to the bed 100 to when the assistance by the motors 22R and 22L is started is the same.

As described above, as shown in FIGS. 8A to 8D and 9, the transport assist equipment 1 according to the embodiment assists the transport of the bed 100 by the mecanum wheels 21R and 21L instead of the known axle and driving wheels in the related art. Accordingly, even a heavy bed 100 such as a medical bed may be transported by one person.

Further, the motors 22R and 22L are automatically driven based on the detection signals of the X-axis force sensor Sw1 and the Y-axis force sensor Sw2. Therefore, no special operation is required to assist the transport. Accordingly, usability of the transport assist equipment 1 can be improved.

Further, as shown in FIGS. 8A to 8D, even if the mecanum wheels 21R and 21L are not turned, the lateral movement, the turning, and the like can be implemented only by rotating the mecanum wheels 21R and 21L forward or backward. The configuration eliminates the need for a space in which the mecanum wheels 21R and 21L turn, thereby making it possible to achieve a more compact configuration than in the related art.

If the mecanum wheels 21R and 21L are driven in a state in which the mecanum wheels 21R and 21L are not rotating, the transport assist equipment 1 and the bed 100 may substantially self-run. This is not desirable for assisting the transport of the bed 100.

On the other hand, as shown in FIG. 11, according to the embodiment, the controller 4 starts driving the mecanum wheels 21R and 21L after detecting the rotation of the mecanum wheels 21R and 21L. That is, when the force is applied to the bed and the movement is started, the mecanum wheel starts to rotate by the movement of the bed. In other words, even if the force is applied to the bed, the mecanum wheel does not rotate until the bed starts to move. Accordingly, the unintentional self-running of the transport assist equipment 1 can be prevented, and the usability of the transport assist equipment 1 can be improved.

As shown in FIG. 10, the controller 4 according to the embodiment can assist the turning of the bed 100 in addition to the straight movement of the bed 1X). Accordingly, the usability of the transport assist equipment 1 can be improved.

As shown in FIGS. 1 to 4, since the transport assist equipment 1 is attached to the lower surface of the bed 100, it is possible to reduce a total length of the transport assist equipment 1 and the bed 100 in the front-rear direction as compared with a case where the transport assist equipment 1 is attached to the front end portion of the bed 100, for example. Accordingly, the bed 100 can be carried into various spaces such as an elevator and an operating room without attaching and detaching the transport assist equipment 1 each time. Accordingly, it is advantageous in improving the usability of the transport assist equipment 1.

<<Other Embodiments>>

In the above-described embodiment, the bed 100 is exemplified as the object, whereas the object to which the transport assist equipment 1 can be attached is not limited to the bed 100. The transport assist equipment 1 according to the present disclosure may be attached to, for example, a cart.

In the above described embodiment, the strain gauge type X-axis force sensor Sw1 and the Y-axis force sensor Sw2 are exemplified as the first sensors for detecting the force applied to the bed 100, whereas the present disclosure is not limited thereto. An acceleration sensor or a piezoelectric force sensor may be used as the first sensor.

What is claimed is:

1. A transport assist equipment comprising:

a body comprising:

an attachment plate body configured to be attached to a frame of an object for which movement of the object is to be assisted by the transport assist equipment;

a first plate attached to a lower surface of the attachment plate body;

a first plurality of linear guides configured to be slidable in only an x-axis direction of an x-axis in an x-y plane parallel to a surface of a floor, the first plurality of linear guides attached to a lower surface of the first plate;

a second plate attached to a lower surface of the first plurality of linear guides;

a second plurality of linear guides configured to be slidable in only a y-axis direction of a y-axis in the x-y plane parallel to the surface of the floor, the second plurality of linear guides attached to a lower surface of the second plate;

a third plate attached to a lower surface of the second plurality of linear guides;

an x-axis force sensor attached to a first side of the first plate in the x-axis direction and a first side of the second plate in the x-axis direction; and a y-axis force sensor attached to a second side of the second plate in the y-axis direction and a second side of the third plate in the y-axis direction;

a plurality of mecanum wheels attached to the body; and a processor configured to obtain a first signal from the x-axis force sensor indicating a first strain in the x-axis direction between the frame and the plurality of mecanum wheels and a second signal from the y-axis force sensor indicating a second strain in the y-axis direction between the frame and the plurality of mecanum wheels, and control the plurality of mecanum wheels to rotate based on the first signal and the second signal.

2. The transport assist equipment according to claim 1, further comprising:

a suspension coupled to a lower surface of the third plate and coupled to the plurality of mecanum wheels, the suspension configured to bias the plurality of mecanum wheels against the surface of the floor; and a plurality of motors configured to drive the plurality of mecanum wheels, respectively, wherein the processor is configured to control the plurality of motors to rotate the plurality of mecanum wheels based on the first signal and the second signal.

3. The transport assist equipment according to claim 2, further comprising a bracket coupled between the suspension and the plurality of mecanum wheels.

4. The transport assist equipment according to claim 3, wherein the processor is configured to determine a magnitude and a direction of a force in the x-y plane applied to the object based on the first signal and the second signal and control the plurality of motors to rotate the plurality of mecanum wheels based on the magnitude and the direction of the force.

5. The transport assist equipment according to claim 4, further comprising a gyro sensor configured to sense a turning direction and a turning speed of the object, wherein the processor is configured to control the plurality of motors to rotate the plurality of mecanum wheels based on the magnitude and the direction of the force, and the turning direction and the turning speed of the object.

6. The transport assist equipment according to claim 5, further comprising a rotation sensor configured to sense rotation of the plurality of mecanum wheels, wherein the processor is configured to control the plurality of motors to rotate the plurality of mecanum wheels based on the magnitude and the direction of the force, the turning direction and the turning speed of the object, and the rotation of the plurality of mecanum wheels.

7. The transport assist equipment according to claim 6, wherein the processor is configured to determine whether the plurality of mecanum wheels rotate based on a signal output by the rotation sensor, and control the plurality of motors to rotate the plurality of mecanum wheels based on the magnitude and the direction of the force, and the turning direction and the turning speed of the object, in response to determining that the plurality of mecanum wheels rotate.

8. A bed to which a transport assist equipment according to claim 1 is attached.

\* \* \* \* \*